(12) United States Patent
Cummins

(10) Patent No.: US 8,559,171 B2
(45) Date of Patent: Oct. 15, 2013

(54) DOCKING STATION, AND ASSOCIATED METHODOLOGY, FOR A MINI PERSONAL COMPUTER

(75) Inventor: Fred A. Cummins, Pinckney, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1209 days.

(21) Appl. No.: 12/035,811

(22) Filed: Feb. 22, 2008

(65) Prior Publication Data

US 2009/0231801 A1 Sep. 17, 2009

(51) Int. Cl.
*G06F 1/16* (2006.01)

(52) U.S. Cl.
USPC .......... 361/679.41; 361/679.3; 710/303; 710/304

(58) Field of Classification Search
USPC .......................... 361/679.3, 679.41
See application file for complete search history.

(56) References Cited

U.S. PATENT DOCUMENTS

| | | | |
|---|---|---|---|
| 6,407,914 B1 * | 6/2002 | Helot | 361/679.41 |
| 6,489,932 B1 * | 12/2002 | Chitturi et al. | 345/30 |
| 6,626,686 B1 | 9/2003 | D'Souza | |
| 6,643,127 B1 | 11/2003 | Richardson | |
| 7,054,965 B2 * | 5/2006 | Bell et al. | 710/72 |
| 7,401,172 B2 * | 7/2008 | Chang | 710/106 |
| 2003/0041206 A1 * | 2/2003 | Dickie | 710/303 |
| 2005/0041385 A1 * | 2/2005 | Kikinis et al. | 361/683 |
| 2005/0185364 A1 * | 8/2005 | Bell et al. | 361/679 |
| 2006/0061963 A1 | 3/2006 | Schrum | |

* cited by examiner

*Primary Examiner* — Anthony Q Edwards

(57) ABSTRACT

A docking station for a mini personal computer. The docking station formed of the shell of a laptop computer at which a user keyboard and a display screen are supported at the docking station. Additional elements, such as a computer hard drive or computer mass storage device are also supported at the docking station. When the mini personal computer is received at a docking port of the docking station, the processor of the mini personal computer is able to make use of the elements supported at the docking station.

19 Claims, 3 Drawing Sheets

DOCKING STATION, AND ASSOCIATED METHODOLOGY, FOR A MINI PERSONAL COMPUTER

The present invention relates generally to a manner by which to overcome computer-peripheral and user-interface size limitations of a mini personal computer. More particularly, the present invention relates to a docking station, and an associated methodology, at which to dock the mini personal computer.

The docking station is formed of a laptop computer shell at which the mini personal computer is connectable at a docking port of the docking station. When connected to the docking station, the processor of the mini personal computer is connected to, and is operated in conjunction with, laptop-shell-supported devices.

BACKGROUND OF THE INVENTION

Advancements in digital processing technologies have brought about significant changes throughout many facets of modern society. Personal computers, for instance, made possible as a result of such advancements, are used by many, both pursuant to business, and other enterprise, activities as well as pursuant to communication and entertainment activities. And, for many, ready access to personal computers, or the like, is an everyday necessity.

Personal computers are oftentimes interconnected by way of computer networks, such as Local Area Networks (LANs) or by way of Wide Area Network (WAN) connections, such as those provided by way of the Internet. Network connections provide for the communication of data between distantly-positioned computer devices. Communication services as well as data retrieval and data storage services are regularly carried out by way of network-connected computer devices.

Advancements have also permitted the steady reduction in the dimensional requirements of computer-device circuitry. Computers, previously of relatively large dimensions and weights, are able increasingly to be of smaller dimensions and weights, all while providing increased processing and storage capabilities. Laptop computers, for instance, are regularly used. A laptop computer is, typically, a light weight hand-carriable and self-contained personal computer. Typically, the laptop computer includes a portable power supply that permits operation of the laptop computer without need to connect the computer to an external power supply. Oftentimes, the user interface of the laptop computer is formed of a liquid crystal display screen and a QWERTY keypad supported at a supportive housing, i.e., frame, of the computer. Oftentimes, the housing of the computer includes a hinge piece that defines two separate portions of the housing that are rotatable relative to one another about the hinge piece between an opened and a closed position. The display screen is typically supported at a first of the housing portions, and the keyboard is oftentimes supported at the other of the housing portions. When the housing is in the closed position, the screen and keyboard are unavailable for use by a user but are supportively surrounded by the housing, in protective enclosure. And, when in the open position, the keyboard and screen display are accessible for use by a user of the laptop computer. The laptop computer typically further includes in addition to the user interface and portable power supply, one or more mass storage devices, such as a hard drive device, a CD or DVD read device, or read and write device, as well as any of various additional peripheral devices.

The laptop computer also sometimes includes a connector ports permitting connection of the laptop computer to a computer network such as a local area network or a corresponding connector that, in turn, provides connection of the laptop to a remote computer device.

A laptop computer sometimes includes a port, or other analogous connector that provides for electrical connection with another electrical computing device such as a cell phone or Personal Digital Assistant (PDA). Both a PDA and a cellular phone include a processing device, capable of performing processing functions associated with the cellular phone or PDA functionality. Advancements in the processing capabilities of the processors of devices of such cellular phone and PDA devices have resulted in processing capabilities of such devices that approach those of personal and laptop computers. Computer devices that exhibit these characteristics, while of dimensions corresponding to typical cell phone and PDA devices, are sometimes referred to as Mini Personal Computers (MPCs). An MPC provides improved portability over even laptop computers. However, a limitation of an MPC also lies in its dimensions. A user interface is inconveniently small with limitations on the size permitted of a display screen as well as an input keyboard or the like. And, the dimensional requirements also limit the peripheral devices that can form portions of the MPC.

While an MPC is connectable to a laptop computer, synchronization of the separate devices is typically required. Synchronization requirements sometimes limit synergies that might be possible resulting from the connection together of such devices.

If a manner could be provided by which better to utilize the capabilities of a mini personal computer, its utility would be improved.

It is in light of this background information related to computer devices that the significant improvements of the present invention have evolved.

SUMMARY OF THE INVENTION

The present invention, accordingly, advantageously provides an apparatus, and an associated method, by which to overcome computer peripheral and computer interface size limitations associated with conventional Mini Personal Computers (MPCs).

Through operation of an embodiment of the present invention, a docking station is provided for a mini personal computer. The docking station is comprised of a housing shell configured, e.g., in the shape of a laptop computer shell. The mini personal computer is connectable to the docking station in docking engagement therewith. The laptop-computer-configured shell further supports conventional laptop-computer devices. And, when the mini personal computer is engaged with the docking station, the mini personal computer is connected to, and is operated in conjunction with, the devices supported at the docking station.

The portability inherent of a mini personal computer is maintained while providing the mini personal computer with access to the interface and other peripheral devices supported at the docking station.

In one aspect of the present invention, the docking port forms a receiving port capable of receiving, via an electrical connection, the mini personal computer. The docking port, for instance, is configured to extend into the body of the support frame, physically to support the mini personal computer when the mini personal computer is received at the docking station. In another implementation, the docking port comprises an external connector that connects the mini personal computer electrically to the docking station. In whichsoever configuration, the mini personal computer is electrically connected to devices supported at the laptop computer-shaped support frame.

In another aspect of the present invention, when received at the docking port of the docking station, the processor of the mini personal computer is electrically connected to the devices supported by the docking station. The processor of the mini personal computer forms the central processing unit of the resultant assembly. The docking-station-supported devices form the interface and peripheral devices used by the processor of the mini personal computer. Because the mini personal computer makes use of the docking-station-supported devices, the portability of the mini personal computer is maintained while providing for improved user interface and peripheral capabilities to be accessed and used by the mini personal computer.

In another aspect of the invention, a user interface is supported at the docking station. The user interface is connectable to the mini personal computer, and is electrically connected therewith when the mini personal computer is received at the docking station. The user interface includes a user input element and a user output element. The user input element forms, e.g., a QWERTY-based computer keyboard, or analogous actuation keypad. And, the user output device forms a display screen, such as a liquid crystal display screen. Inputs entered by way of the keyboard provide user input commands and information to the processor of the mini personal computer. And, outputs generated by the mini personal computer are displayable at the display screen of the user interface.

The keyboard and display screen are supported at the docking station and are accessible by the user of the mini personal computer when the docking station is positioned in the open position. The docking station is, e.g., formed of two docking-station parts that are hingedly connected together. The display screen is supported at the first of the parts, and the keypad is positioned at a second of the parts. The parts are hingedly connected together such that, when in the open position, the display screen is viewable, and the keys of the keypad are accessible by the user. Relative rotation about the hinge that hingedly connects together the docking-station parts provides for closing of the docking station into a closed position at which the keypad inaccessible and the display screen is unviewable but such elements are supportably enclosed by the docking station.

In another aspect of the present invention, the docking station supports a memory element, such as a hard drive assembly or a CD/DVD reader. The memory element is positioned in electrical connection with the mini personal computer when the mini personal computer is received at the docking port of the docking station. Contents stored at the memory device are readable therefrom, and data generated during operation of the processor of the mini personal computer is writable thereto.

In another aspect of the present invention, the laptop-computer-configured docking station includes a battery power supply or a connector to an external power supply. When the mini personal computer is docked at the receiving port of the docking station, the mini personal computer is powered by the power supply of the docking station or its connection to the external power supply.

In another aspect of the present invention, the docking station includes an external connector configured to provide for connection to a local area, or other, network. When the mini personal computer is received at the receiving port of the docking station, the mini personal computer is connected, by way of the external connector, to the local, or other, network.

The operation of the processor of the mini personal computer is thereby provided network connectivity by way of the docking station.

Unlike a conventional laptop computer, the laptop-computer-configured-docking station does not contain a central processing unit, and synchronization is not required of the mini personal computer when received at the docking port of the docking station. Coordination that is otherwise required when a mini personal computer is received at a conventional laptop computer is obviated as merely electrical connections are required to be made and are automatically made when the mini personal computer is received at the receiving port.

In these and other aspects, therefore, a docking station, and an associated methodology is provided for a mini personal computer. The docking station comprises a support frame. An MPC receiving port is formed at the support frame. The MPC receiving port is configured to receive the MPC. A user interface is supported at the support frame and is electrically connectable to the MPC when received at the MPC receiving port. The user interface is configured to provide interface for the MPC during operation thereof when received at the MPC receiving port.

A more complete appreciation of the scope of the present invention and the manner in which it achieves the above-noted and other improvements can be obtained by reference to the following detailed description of presently preferred embodiments taken in connection with the accompanying drawings which are briefly summarized below, and by reference to the appended claims.

DETAILED DESCRIPTION

Figure 1:
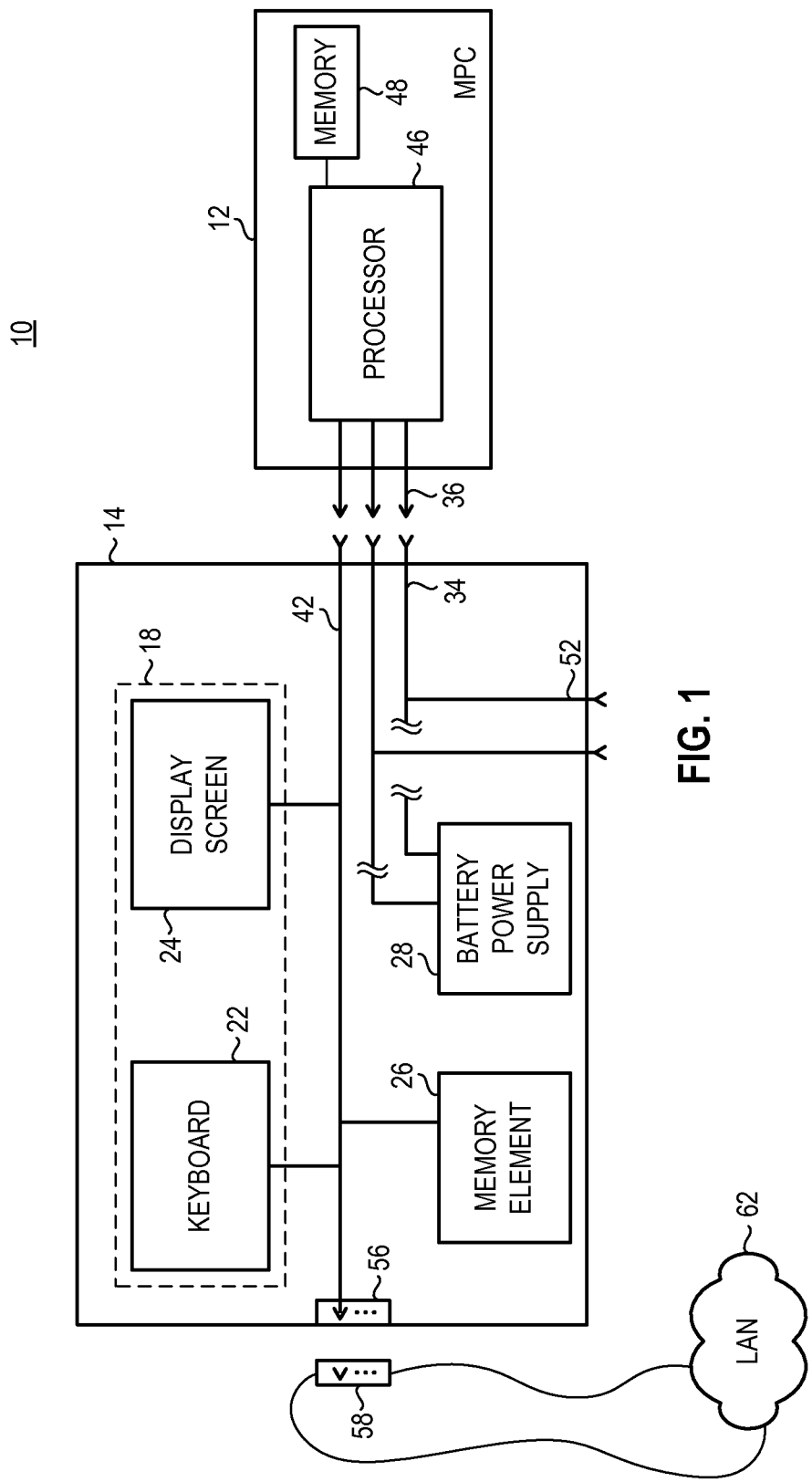
FIG. 1 illustrates a functional block diagram of an arrangement including an embodiment of the present invention.

Referring first to FIG. 1, an arrangement, shown generally at 10, illustrates positioning of a Mini Personal Computer (MPC) 12 positioned proximate to a docking station 14. The docking station 14, in the exemplary implementation is configured in the shape of a laptop computer, formed of the shell, i.e., housing, of the laptop computer. The docking station includes functional elements of the laptop computer, but, in the exemplary implementation, does not include a CPU (Central Processing Unit) at the laptop computer shell forming the docking station. The docking station, however, includes peripheral, and other, devices that typically form part of elements of a laptop computer. Here, the docking station formed of the laptop computer shell is shown to include a user interface 18 including a keyboard 22 and a display screen 24, a memory element 26, and a portable, i.e., battery, power supply 28. A docking port 32 is formed at the docking station, configured to receive the mini personal computer thereat. The docking port includes connectors 34 that provide for electrical connections to the mini personal computer when the MPC is received at the docking port. The mini personal computer similarly includes electrical connectors 36 that connect with the connectors 34 when the mini personal computer is received at the docking port 32.

Conductive paths 42 interconnect the elements 22, 24, 26, and 28 with a processor 46 of the mini personal computer.

Thereby, when received at the docking port, the processor 46 is positioned in electrical connectivity with such elements.

The laptop-computer-configured docking station here further includes a power cable connector 52 that provides for connection of the docking station with an external power source (not separately shown). The external power supply provides operative power to power the elements of the docking station as well as to provide operative power to the mini personal computer when the mini personal computer is positioned at the docking port. When the battery power supply is rechargeable, the operative power provided by way of the connectors 52 is additionally used to recharge the battery cells of the battery power supply.

In the exemplary implementation, the docking station 14 further includes a connector 56 that provides for connection to a mated connector 58 that is connected to a Local Area Network (LAN) 62. When the mini personal computer 12 is received at the receiving port 32, and the connector 56 is connected to the connector 58, connectivity is provided between the mini personal computer and a remote device connected, directly, or indirectly, to the Local Area Network 62.

During operation, the docking of the mini personal computer at the docking port 32 provides the mini personal computer with access to the elements supported at the docking station synchronization is not required with a CPU, conventionally deployed as part of a laptop computer. Rather, the processor 46 of the mini personal computer forms the CPU of the resultant assembly formed of the MPC and the elements of the docking station 14. The portability of the mini personal computer is maintained while also providing the mini personal computer with increased functionality and user interactivity.

Once connected to the docking station at the docking port, the keyboard and the display screen of the user interface 18 are placed in connectivity with the processor 46 of the mini personal computer. Inputs entered by a user by way of the keyboard 22 are provided to the processor. And, outputs generated as a result of algorithm execution by the processor are displayed at the display screen 24. In one implementation, the mini personal computer includes its own input actuator and display screen and is configured, when the mini personal computer is received at the docking port, to make inoperative the user interface elements of the mini personal computer. In an alternate implementation, the selection not to utilize the user interface is made manually. In one MPC configuration, the MPC forms a severable device in which the processor part of the MPC is severable from other parts of the MPC. In this configuration, only the processor part is required to be docked at the receiving port of the docking station. That is to say, the mini personal computer includes one or more severable component parts. The component part that includes the processor and, e.g., the memory, is severable from the mini personal computer and is receivable at the receiving part of the docking station. In other implementations, the severable component part of the mini personal computer includes additional, or other, parts. And, howsoever configured, the component part is receivable at the receiving port.

Also pursuant to operation of the assembly formed of the mini personal computer and the docking station 14, the memory element 26 is accessible to retrieve data stored at the memory element and to write data to the memory element pursuant to execution of algorithms by the processor 46. Data-intensive applications that might otherwise be precluded from execution by the mini personal computer are, instead, through access to the memory element 26, able to be performed by the mini personal computer. Additionally, through use of a larger battery power supply 28 to power operation of the mini personal computer or through use of the unlimited power supply provided by way the external power supply connected by way of the connectors 52, storage capacity limitations that might otherwise limit the usefulness of the mini personal computer are less likely to occur. And, upon completion of computer-related operations, the mini personal computer is simply removed out of its position at the docking port 32. A user is able to transport the mini personal computer 12 separately, or both the mini personal computer 12 and the docking station 14. Due to the portability, and severability, of both the mini personal computer and the laptop computer, the devices are readily separately transportable by a user and subsequently connectable together and to a conventional computer docking port to provide connectivity to a network. Or, multiple docking stations are provided, e.g., at different work areas. The user transports the mini personal computer and connects the MPC to the docking station at the work area at which the user is positioned.

Figure 2:
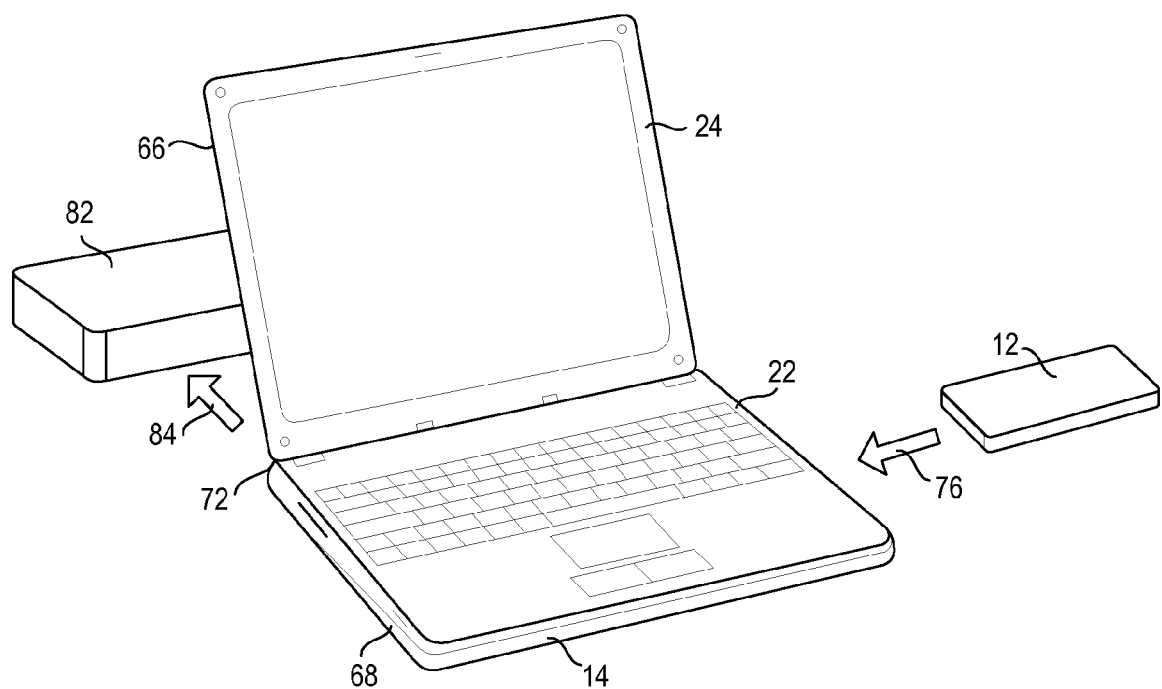
FIG. 2 illustrates a partial functional block, partial perspective, diagram of a portion of the arrangement shown in FIG. 1.

FIG. 2 illustrates portions of the arrangement 10, shown in FIG. 1. Here, the docking station 14 is shown to be configured as a shell of a laptop computer. That is to say, the docking station includes a laptop-computer housing. The housing is here shown to be formed of a first portion 66 and a second portion 68. The first and second portions are connected together by way of a hinge connector 72 that provides for hinged rotation of the portions 66 and 68 thereabout. The laptop-computer-configured shell is, as-shown, positioned in an open position in which the keyboard 22 is accessible, and the display screen 24 is viewable. Relative rotation of the portion 66 and 68 towards one another into a closed position supportively encloses the keyboard and user display in protective enclosure by the housing portions. Hidden from view in the figure are the memory element 26 and power supply 28, shown in FIG. 1. Such elements are, e.g., supported within the first portion 68 of the housing shell.

In the illustration of FIG. 2, the mini personal computer 12 is positioned along side of the docking station 14, translatable in the direction indicted by the arrow 76 into electrical connection with connectors 34 (hidden from view in FIG. 2) to connect the mini personal computer with the docking station 14. When so-connected, the mini personal computer is operable in conjunction with the user interface formed of the keyboard 22 and display screen 24 as well as other elements of the docking station. And, the mini personal computer is provided with operable power provided by way of the docking station.

The docking station 14 is positioned along side of a laptop dock 82 that includes connectors 58 (not shown in the figure) that connect with connectors 56 (also not shown in FIG. 2). Translation of the docking station 14 in the direction indicated by the arrow 84 causes the docking station to abut against the laptop dock 82 such that the connectors 56 and 58 engage with one another. When the docking station is connected to the laptop dock and the mini personal computer is engaged with the docking station, the assembly formed of the mini personal computer and the docking station 14 together define a node of a network to which the laptop dock is connected. Computer operations that require communication of data from or to the node are carried out, otherwise in conventional manner. Both the mini personal computer and the laptop computer can be removed out of their respective engagements with the laptop dock and the docking station to permit their separate carriage, alone or together, from one location to another. The portability of the mini personal computer is maintained while providing the mini personal computer with the advantages associated with a larger device, such as a laptop computer. Because the processor of the mini personal computer acts as the processor for the elements of the docking station, synchronization between the CPU of a conventional laptop computer and a mini personal computer are not required.

Figure 3:
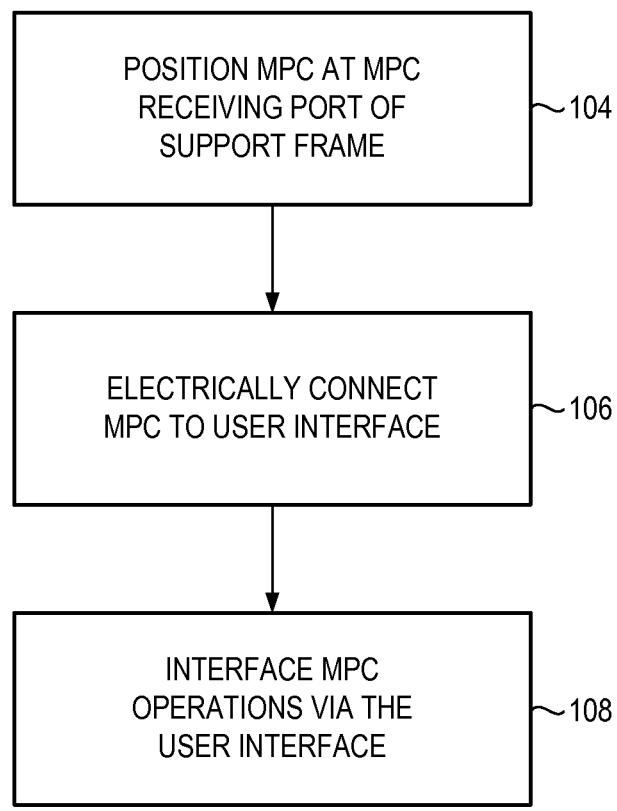
FIG. 3 illustrates method flow diagram representative of the method of operation of an embodiment of the present invention.

FIG. 3 illustrates a method, shown generally at 102, representative of the method of operation of an embodiment of the present invention. The method facilitates use of a mini personal computer.

First, and as indicated by the block 104, the mini personal computer is positioned at a mini personal computer receiving port formed at a support frame that supports a user interface. Then, and as indicated by the block 106, the mini personal computer is electrically connected with the user interface. And, as indicated by the block 108, operations of the mini personal computer are interfaced by way of the user interface.

Because the mini personal computer takes advantage of elements supported at the laptop-computer frame forming a docking station, the features of the docking station are provided to a user of the mini personal computer when the personal computer is docked at the docking station. And, by releasing the mini personal computer at the docking station, the advantages of the size advantages of the mini personal computer are maintained.

Presently preferred embodiments of the invention and many of its improvements and advantages have been described with a degree of particularity. The description is of preferred examples of implementing the invention and the description of preferred examples is not necessarily intended to limit the scope of the invention. The scope of the invention is defined by the following claims.

What is claimed is:

1. A docking station, for a computer, said docking station comprising:
    a support frame;
    a computer receiving port formed at said support frame, said computer receiving port configured to receive the computer;
    a user interface supported at said support frame and electrically connectable to the computer when received at said computer receiving port, said user interface configured to provide interface for the computer during operation thereof while received at said computer receiving port; and
    a memory element in communication with said computer receiving port such that said memory element receives and stores data from said computer as a backup to data stored on said computer when said computer is connected to said computer receiving port;
    in which said user interface is configured to control transfer and synchronization of data between said memory element and said computer when said computer is received at said receiving port, and
    wherein user interface elements of the computer are rendered inoperative when the computer is received at the receiving port.

2. The docking station of claim 1 wherein said support frame comprises a laptop computer shell.

3. The docking station of claim 1 further comprising a network connector configured to form a network connection to provide network connectivity to the computer when received at said computer receiving port.

4. The docking station of claim 3 wherein said network connector comprises a laptop-dock connector.

5. The docking station of claim1 wherein said user interface comprises an input keyboard.

6. The docking station of claim 1 wherein said user interface comprises a display screen.

7. The docking station of claim 1 wherein said docking station further comprises a power supplier configured to supply operative power to the computer when received at said computer receiving port.

8. The docking station of claim 1 wherein said user interface is configured to provide the interface for the computer free of synchronization therewith when the computer is received at said computer receiving port.

9. The docking station of claim 1 wherein said docking station further comprises a peripheral device electrically connectable to the computer when received at said computer receiving port.

10. A method of using a computer, said method comprising:
    positioning the computer at a computer receiving port formed at a support frame that supports a user interface;
    electrically connecting the computer with the user interface; and
    interfacing operations of the computer via the user interface,
    wherein the user interface elements of the computer are rendered inoperative when the computer is received at the receiving port.

11. The method of claim 10 wherein said positioning comprises positioning the computer at a computer receiving port formed at a laptop computer shell.

12. The method of claim 10 further comprising forming a network connection that provides network connectivity to the computer when received at the computer receiving port.

13. The method of claim 12 wherein the network connection is provided via a laptop-dock connector.

14. The method of claim 12 wherein said electrically connecting comprises electrically connecting the computer with an input keyboard.

15. The method of claim 12 wherein said electrically connecting comprises electrically connecting the computer with a display screen.

16. The method of claim 10 wherein said positioning further comprises positioning the computer at a computer receiving port formed at a support frame that further supports a storage element.

17. The method of claim 16 wherein said electrically connecting further comprises electrically connecting the computer with the storage element.

18. The method of claim 10 further comprising providing operative power to the computer by way of the support frame when the computer is positioned at the computer receiving port.

19. A computer assembly network, comprising:
    a computer component part including at least a processor;
    a docking station having a docking port configured to receive the computer component part; and
    a computer component supported at said docking station and electrically connectable to the computer component part when received at the docking port of said docking station, said computer component configured to operate together with the processor of said computer component part;
    wherein said docking station further comprises a memory element in communication with said docking port such that said memory element receives and stores data from said computer component part as a backup to data stored on said computer component part when said computer component part is connected to said computer docking port, in which said computer component of said docking station is configured to control transfer and synchronization of data between said memory element and computer component part,
wherein computer component of the computer component part is rendered inoperative when the computer component part is received at the docking port.

* * * * *

UNITED STATES PATENT AND TRADEMARK OFFICE
CERTIFICATE OF CORRECTION

| | | |
|---|---|---|
| PATENT NO. | : 8,559,171 B2 | Page 1 of 1 |
| APPLICATION NO. | : 12/035811 | |
| DATED | : October 15, 2013 | |
| INVENTOR(S) | : Fred A. Cummins | |

It is certified that error appears in the above-identified patent and that said Letters Patent is hereby corrected as shown below:

In the Claims:
In column 7, line 66, in Claim 5, delete "claim1" and insert -- claim 1 --, therefor.

Signed and Sealed this
Fourth Day of February, 2014

Michelle K. Lee
*Deputy Director of the United States Patent and Trademark Office*